United States Patent
Liu et al.

(10) Patent No.: US 7,295,827 B2
(45) Date of Patent: Nov. 13, 2007

(54) MOBILE STATION DYNAMIC POWER SAVING CONTROL

(75) Inventors: Jiewen Liu, San Diego, CA (US); Chih C. Tsien, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 10/814,452

(22) Filed: Mar. 31, 2004

(65) Prior Publication Data

US 2005/0221869 A1 Oct. 6, 2005

(51) Int. Cl.
*H04B 1/16* (2006.01)

(52) U.S. Cl. .............................. 455/343.2; 455/343.4; 340/7.34; 340/7.38; 370/311

(58) Field of Classification Search ................ 455/522, 455/572–574, 127.5, 343.2, 343.1, 343.5; 370/318, 454, 311; 340/7.32–7.38
See application file for complete search history.

(56) References Cited

U.S. PATENT DOCUMENTS

| | | | | |
|---|---|---|---|---|
| 5,241,691 A | * | 8/1993 | Owen | .......................... 455/517 |
| 5,583,866 A | * | 12/1996 | Vook et al. | .................. 370/312 |
| 5,584,048 A | * | 12/1996 | Wieczorek | .................. 340/7.33 |
| 6,002,918 A | * | 12/1999 | Heiman et al. | ............. 340/7.38 |
| 6,078,819 A | * | 6/2000 | Ciccone et al. | ............. 455/463 |
| 6,628,972 B1 | * | 9/2003 | Lee | ............................. 455/574 |
| 6,804,542 B1 | * | 10/2004 | Haartsen | ...................... 455/574 |
| 6,829,493 B1 | * | 12/2004 | Hunzinger | ................... 455/574 |
| 6,879,567 B2 | * | 4/2005 | Callaway et al. | ........... 370/311 |
| 6,917,598 B1 | * | 7/2005 | Emeott et al. | .............. 370/311 |

* cited by examiner

*Primary Examiner*—Duc M. Nguyen
*Assistant Examiner*—Anthony S. Addy
(74) *Attorney, Agent, or Firm*—LeMoine Patent Services, PLLC; Dana B. LeMoine

(57) ABSTRACT

A mobile station in an 802.11 wireless network dynamically adjusts a number of 802.11 beacon intervals to sleep based on a power savings level and a required wake-up time to receive packets from an access point. The power savings level is based on data traffic activity in a current period. The mobile station wakes up to receive a beacon, and if a beacon is not received, the mobile station sleeps for one additional beacon period.

15 Claims, 5 Drawing Sheets

MOBILE STATION DYNAMIC POWER SAVING CONTROL

FIELD

The present invention relates generally to computer networks, and more specifically to wireless networks.

BACKGROUND

Wireless networks typically include mobile stations and access points. Mobile stations may run off battery power, and conserving battery power may allow a mobile station to run longer.

DESCRIPTION OF EMBODIMENTS

Figure 1:
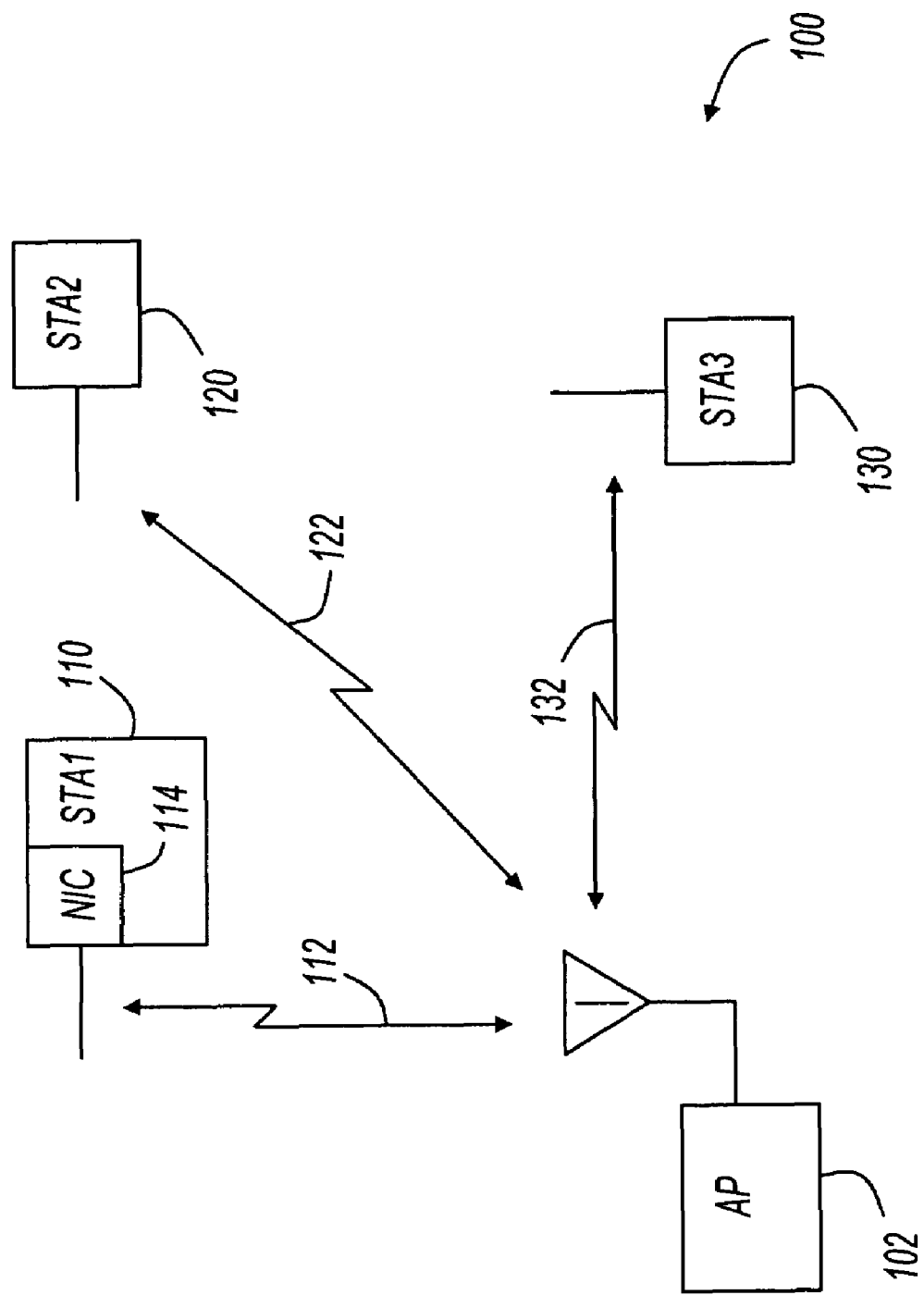
FIG. 1 shows a diagram of a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a wireless network. Wireless network 100 includes access point (AP) 102 and mobile stations (STA) 110, 120, and 130. In some embodiments, wireless network 100 is a wireless local area network (WLAN). For example, one or more of mobile stations 110, 120, and 130, or access point 102 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition.

Mobile stations 110, 120, and 130 may be any type of mobile station capable of communicating in network 100. For example, the mobile stations may be computers, personal digital assistants, wireless-capable cellular phones, or the like. As explained below, in some embodiments, mobile stations 110, 120, and 130 operate in compliance with an 802.11 standard, and are also capable of saving power by entering one of many different possible power savings modes.

Access point 102 communicates with mobile station 110 (also referred to as "STA1") using signal 112. Access point 102 communicates with mobile station 120 (also referred to as "STA2") using signal 122, and access point 102 communicates with mobile station 130 (also referred to as "STA3") using signal 132. Mobile station 110 includes network interface card (NIC) 114. In some embodiments, mobile station 110 may be a computer such as a notebook computer or a desktop computer that includes NIC 114. Mobile stations 120 and 130 are shown without NICs. In some embodiments, mobile stations 120 and 130 may be wireless devices that have built-in wireless capability. For example, mobile station 120 may be a notebook computer having a chipset with built-in wireless connectivity capability.

Wireless network 100 is shown as an infrastructure network in which the mobile stations communicate with an access point. In some embodiments of the present invention, mobile stations communicate with other mobile stations directly in an ad hoc network.

Mobile stations may save power by "sleeping." When a mobile station is asleep, all or a portion of the mobile station enters a reduced-power state. Multiple power savings modes may exist. For example, a mobile station may sleep for varying amounts of time to obtain different power saving levels. The remainder of this description details various power saving embodiments of 802.11 compliant mobile stations, but the various embodiments are not limited to 802.11 compliant systems. The discussion is provided within an 802.11 framework to provide examples within a recognizable context, but the various embodiments of the present invention are not meant to be limited to 802.11 systems.

In some embodiments, an access point may periodically send beacons to mobile stations. For example, access point 102 may periodically transmit beacon frames to be received by any mobile station within range. Access points may also buffer uni-cast data packets for a sleeping station and indicate that in the Traffic Indication Map (TIM) element of beacon. A mobile station in a reduced power state may be required to wake up periodically and listen to the beacons. If the mobile station receives an indication of buffered packets, it may, for example, wake up and poll the packets from the access point. Further, in 802.11 embodiments, broadcast and/or multicast packets that an access point has buffered will be sent out when the Delivery Traffic Indication Message (DTIM) Count in the TIM element becomes zero. The DTIM count is expressed as a number of beacon intervals, and the DTIM count decrements by one in each beacon. A mobile station is also required to wake up for broadcast or multicast packets when the DTIM count becomes zero. The term "broadcast time" as used herein refers to a time at which a mobile station should be awake to receive broadcast or multi-cast packets. In some embodiments, mobile stations include a timer to cause interrupts at Target Beacon Transmission Times (TBTT) based on beacon interval.

Mobile stations may include an Auto-Power-Saving mode (APS). In some embodiments, the APS mode may be enabled or disabled through user configurations. When the APS is disabled, a wireless device is fully powered during operation. While the APS is enabled, the device may enter or exit the sleep mode based on the evaluation of traffic activities. In some embodiments, the traffic activity is a percentage of the time consumed for data traffic over a desired time period. For example, some embodiments include different levels with level five being the deepest sleep mode of power saving modes corresponding to different traffic activities. If transmit/receive (TX/RX) activities in the current time interval are within a range, for example 35%, the device may select power level 2 and enter sleep mode for four beacon intervals. The wake up time for receiving a beacon and evaluation will be at the end of the sleep interval. Table 1, below, shows one example set of relationships among traffic activities, power savings mode, desired sleep interval, and desired wake-up time. In some embodiments, a mobile station may stay awake for a certain time after TX/RX to avoid decision flipping between a sleep mode and normal mode.

TABLE 1

| Traffic Activities | Power Mode | Desired Sleep Interval | Desired Wake-up Time (for receiving beacon and evaluation) |
|---|---|---|---|
| >60% | Power level 0 | Zero | Every beacon interval |
| 40%-60% | Power level 1 | 2 beacon intervals | Every 2 beacon intervals |
| 30%-40% | Power level 2 | 4 beacon intervals | Every 4 beacon intervals |
| 20%-30% | Power level 3 | 6 beacon intervals | Every 6 beacon intervals |
| 10%-20% | Power level 4 | 8 beacon intervals | Every 8 beacon intervals |
| <10% | Power level 5 | 10 beacon intervals | Every 10 beacon intervals |

The desired sleep interval, expressed in numbers of beacon intervals in Table 1, refers to a desired amount of time that a mobile station may sleep to conserve power until waking up to receive the next beacon, where longer desired sleep intervals correspond to more power conservation. The desired wake-up time describes when a mobile station would wake up based only on the desired sleep interval. As described above, however, mobile stations may need to receive broadcast or multicast packets at broadcast times. Some embodiments determine the actual wake-up time based on the desired sleep interval and the broadcast time. Various embodiments that are described below use both the desired sleep interval and the broadcast time to determine the actual wake-up time.

The example power savings levels shown in Table 1 are shown as discrete levels. In some embodiments, a continuous function is evaluated to determine a next power savings level or a desired sleep interval. The manner in which a power savings level or desired sleep interval is determined as a function of traffic activity is not a limitation of the present invention.

Figure 2:
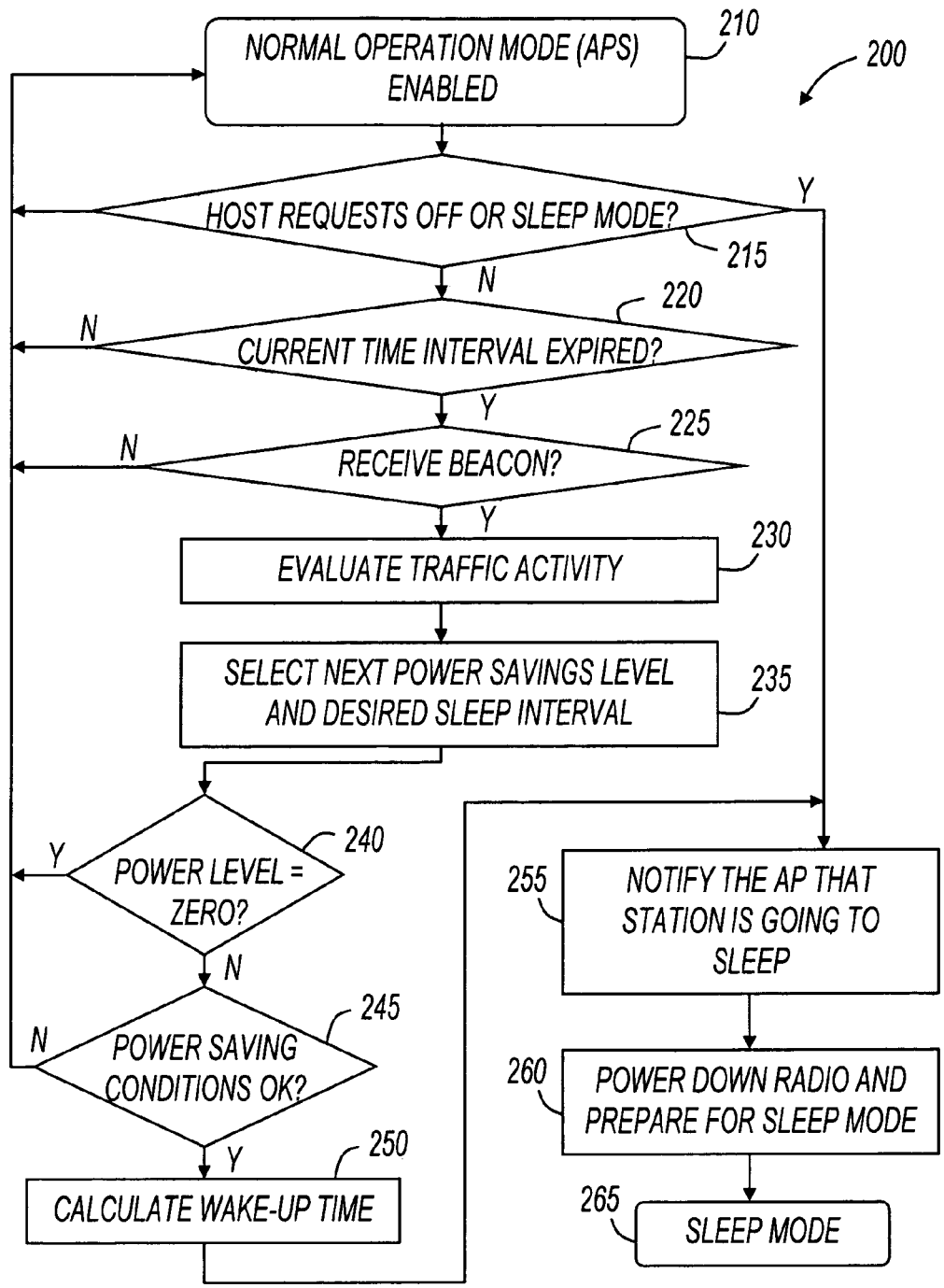
FIGS. 2 and 3 show flowcharts in accordance with various embodiments of the present invention.

FIG. 2 shows a flowchart in accordance with various embodiments of the present invention. In some embodiments, method 200 describes the operation of a mobile station when not asleep, also referred to as "normal mode." In some embodiments, method 200, or portions thereof, is performed by a mobile station, a network interface card, a processor, or an electronic system, embodiments of which are shown in the various figures. Method 200 is not limited by the particular type of apparatus, software element, or system performing the method. The various actions in method 200 may be performed in the order presented, or may be performed in a different order. Further, in some embodiments, some actions listed in FIG. 2 are omitted from method 200.

Method 200 is shown beginning at block 210 in which the mobile station is operating normally with Auto-Power savings (APS) mode enabled. In some embodiments, when APS is not enabled, method 200 is not performed, and the mobile station stays powered on. At 215, if a host requests that all or a portion of the mobile station be turned off or put to sleep, control is transferred to 255, which is described further below. In some embodiments, the host referred to at 215 may be a processor within a mobile station, and the actions of 215 may be performed by a network interface card or a processor coupled to a wireless network interface.

At 220, if the current time interval has expired, method 200 continues to 225 to check if a beacon is received. If either the current time interval has not expired, or if a beacon is not received, method 200 stays in normal operation at 210. The time interval referred to at 220 may refer to any wake-up time interval selected based on traffic activities. In some embodiments, the current time interval may be expressed in a number of beacon intervals. For example, the current time interval may be one beacon interval, two beacon intervals, or more.

At 230, traffic activity is evaluated. In some embodiments, the traffic activity is measured as a percentage of the current time interval that is used for data traffic. For example, the volume of transmit/receive (TX/RX) traffic in the current time interval may be measured, and that may be compared against the length of the current time interval. In some embodiments, traffic activity is evaluated using measurements other than total data traffic volume. For example, traffic activity may be expressed in terms of any metric available to the mobile station.

At 235, a next power savings level is selected and a desired sleep interval is selected. In some embodiments, the next power savings level and the desired sleep interval may be selected as a function of the traffic activity evaluated at 230. Referring now back to Table 1, the next power savings level and desired sleep interval may be selected from the table based on traffic activity as listed in the left hand column. For example, if the data traffic exceeds 60% of the current time interval, the next power savings level is selected as power level 0. In some embodiments, the threshold may be higher or lower than 60%. In other embodiments, the next power savings level and the desired sleep interval are selected in a manner different than that represented by Table 1. Further, in some embodiments, the next power savings level may be selected as a function of the traffic activity in the current time interval as well as one or more previous time intervals.

At 240, if the next power savings level selected corresponds to power level 0, method 200 remains in normal operation mode at 210 At 245, if power saving conditions are OK, method 200 proceeds with 250, otherwise method 200 remains in normal operation mode at 210. Powers saving conditions may be, for example, related to criteria such as:

whether the NIC is associated with an AP;

whether the transmission path is empty for certain time period;

whether the receiving path is empty;

whether the station is in the middle of process, such as messages exchanging between stations/AP or between host and NIC, scanning, configuration changing, etc.; or whether radio parts that will be switched off or switched to sleep mode are ready to be switched accordingly.

If any power savings condition fails at 245, then method 200 may remain in normal operation at 210.

At 250, a wake-up time is calculated. The wake-up time referred to at 250 refers to the time at which the mobile station will wake up after being asleep. In some embodiments, the wake-up time corresponds to the end of the desired sleep interval. In various embodiments of the present invention, the next wake-up time is determined based on the desired sleep interval and the broadcast time. Example embodiments to determine the next wake-up time are described more fully below with reference to FIGS. 4 and 5.

At 255, the apparatus performing method 200 notifies the AP that it is going to sleep. In some embodiments, the apparatus performing method 200 is a mobile station such as mobile station 110 (FIG. 1), and access point 102 is notified that mobile station 110 is going to sleep. At 260, the radio in the wireless interface is powered down and the station is prepared for sleep mode, and at 265, the station enters sleep mode. In some embodiments, only the transmitter of the radio is powered down to allow for continued reception, and in other embodiments, the transmitter and receiver are both powered down. When in sleep mode, a mobile station may have every subsystem put in a reduced power state, or may have less than every subsystem put in a reduced power state. For example, in some embodiments, a network interface card (NIC) within a mobile station performs method 200, and only a portion of the NIC is put into a reduced power state when asleep.

Figure 3:
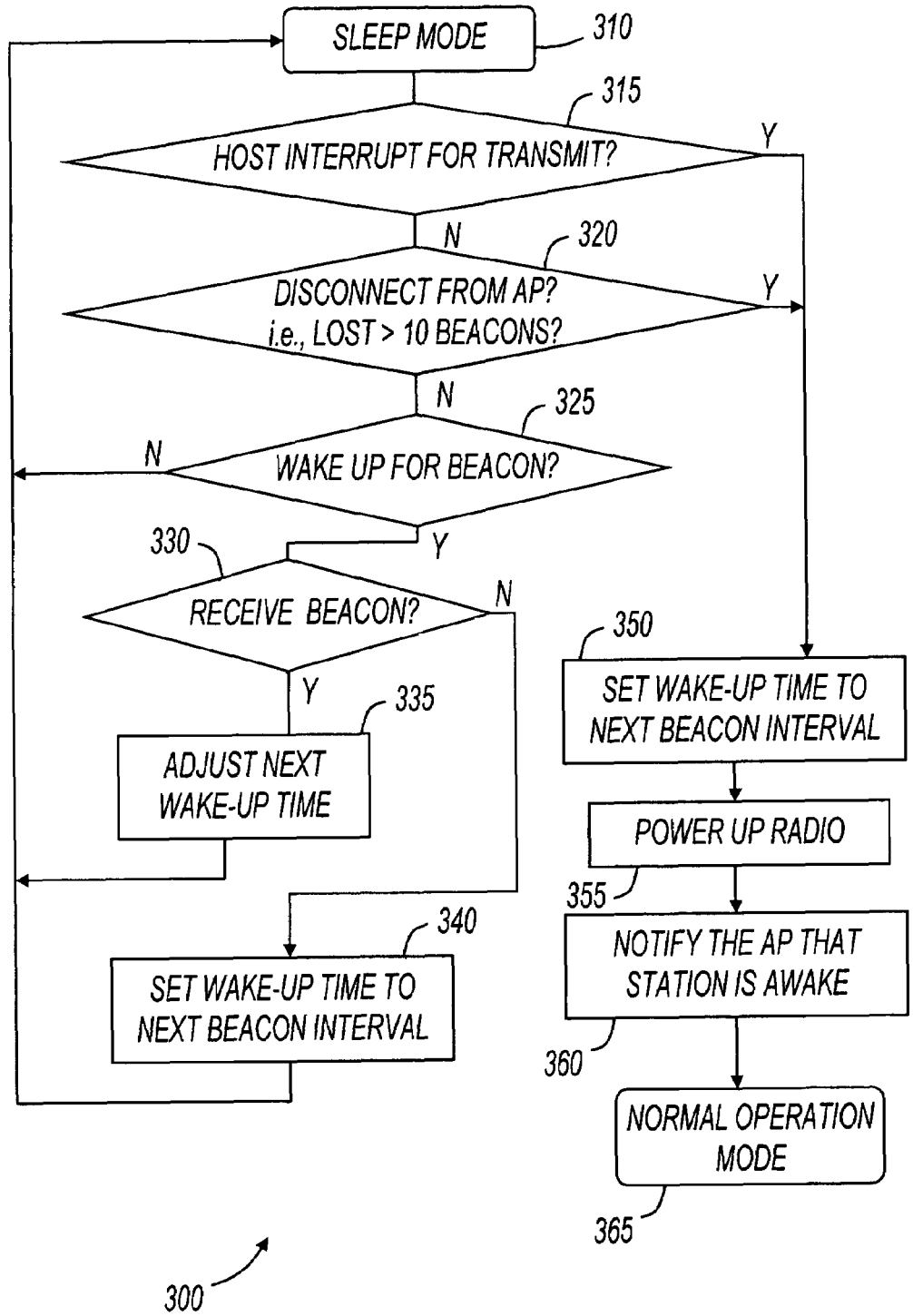

FIG. 3 shows a flowchart in accordance with various embodiments of the present invention. In some embodiments, method 300 describes the operation of a mobile station when asleep to save power. In some embodiments, method 300, or portions thereof, is performed by a mobile station, a network interface card, a processor, or an electronic system, embodiments of which are shown in the various figures. Method 300 is not limited by the particular type of apparatus, software element, or system performing the method. The various actions in method 300 may be performed in the order presented, or may be performed in a different order. Further, in some embodiments, some actions listed in FIG. 3 are omitted from method 300.

Method 300 is shown beginning at block 310 in which the mobile station is in sleep mode. The mobile station may enter sleep mode as shown in method 200 (FIG. 2). If the host interrupts the apparatus performing method 300 at 315, or if the mobile station has missed too many beacons at 320, method 300 continues with block 350 to transition to normal mode. Block 350 is described further below. In some embodiments, the host referred to at 315 may be a processor within a mobile station, and the actions of 315 may be performed by a network interface card or a processor coupled to a wireless network interface.

If not interrupted by the host, and if too many beacons have not been missed, method 300 continues at 325. At 325, method 300 determines if it is time to wake up for a beacon. If not time to wake up, method 300 loops in sleep mode. An apparatus may wake up for a beacon by responding to an interrupt by a TBTT timer. For example, a timer may be set to a wake-up time prior to the apparatus going to sleep, and when the timer expires, the hardware may be interrupted, and a beacon monitor program or task may be performed. If, at 330, a beacon is received, then the next wake-up time is adjusted at 335 to attempt to obtain a longer sleep time period, and if a beacon is not received, the next wake-up time is set to one beacon interval in an attempt to receive the next beacon.

In some embodiments, if a received beacon includes an indication of buffered traffic, a mobile station or NIC performing method 300 may poll an access point to receive the traffic. For example, between 330 and 335, data traffic may be exchanged between a mobile station and an access point. When the data traffic is complete, the next wake-up time is adjusted at 335, and the mobile station returns to sleep mode at 310.

As described above, method 300 may transition to normal mode if the host desires to transmit, or if too many beacons have been missed. At 350, the next wake-up time is set to the end of the next beacon interval, the radio is powered up at 355, the AP is notified at 360, and normal mode is entered at 365.

In some embodiments, all or portions of methods 200 (FIG. 2) and 300 (FIG. 3) are implemented in a task that is run each time a beacon is supposed to arrive at a mobile station. For example, a beacon monitor may be a task or a procedure that keeps running during normal operation to track incoming beacons. The task may be notified using a timer interrupt such as a TBTT interrupt for every incoming beacon. An interrupt driven process such as this may be able to provide accurate timing for power saving control. As a control point set in the beacon monitor, the power saving control procedures may be called each time a beacon is supposed to arrive. The control procedure may then perform all related processes, such as traffic activity evaluations, decisions regarding entering or exiting sleep mode, conditions checking prior to entering sleep mode, hardware powering off or on, and the like.

Figure 4:
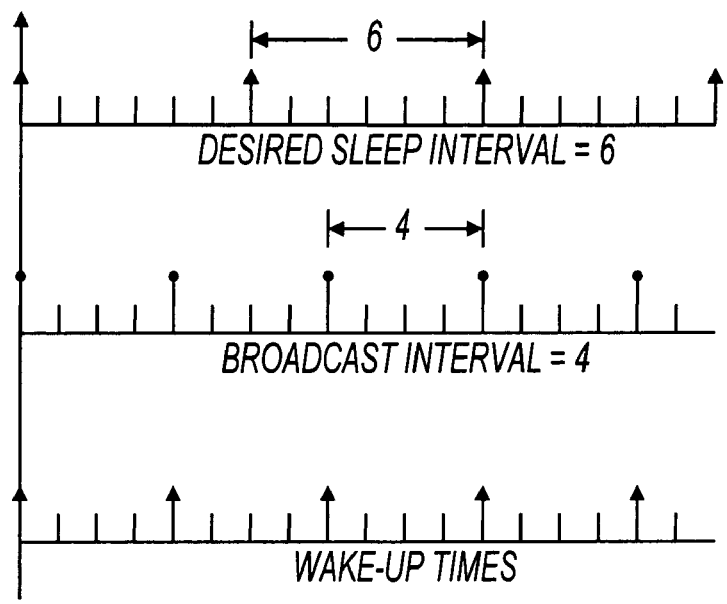
FIGS. 4 and 5 show desired sleep intervals and wake-up times.
Figure 5:
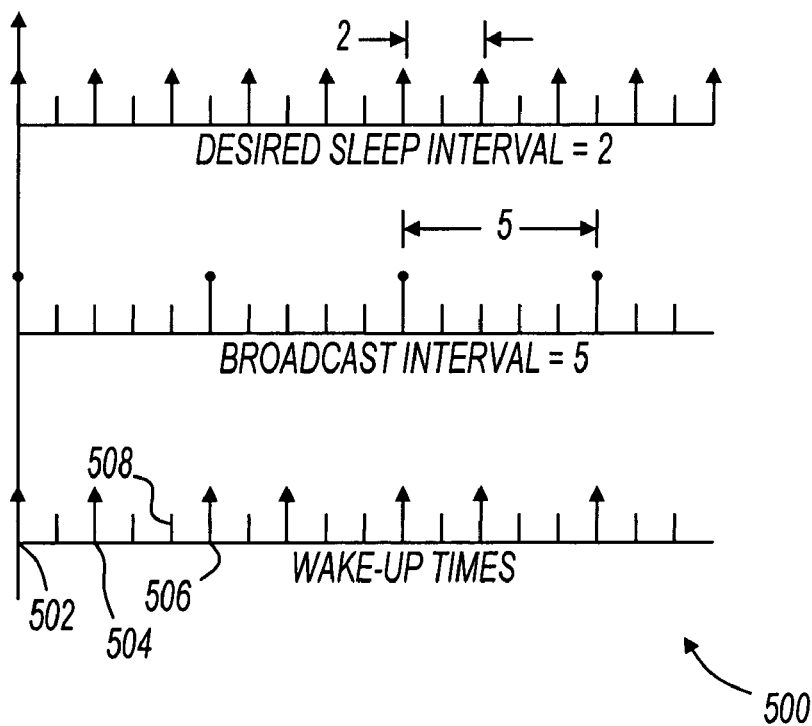

FIGS. 4 and 5 show sequences that demonstrate possible scenarios when determining a wake-up time based on a desired sleep interval and a broadcast interval (the period between broadcast times). At the end of a desired sleep interval, a mobile station in power saving mode may wake up for receiving a beacon, while at the end of a broadcast interval it may also wake up for broadcast or multicast packets. FIGS. 4 and 5 show the calculation to determine the wake up time. For example, FIG. 4 shows wake-up times when the desired sleep interval is greater than the broadcast interval. Sequence 400 shows a desired sleep interval of six beacon intervals. The desired sleep interval may be determined based on the traffic evaluation during the current time interval. For example, in embodiments represented by Table 1 above, a device enters power level three if traffic activity is less than 30% of the current time interval, and the desired sleep interval will be selected as six beacon intervals.

Also shown in FIG. 4 is a broadcast interval equal to four beacon intervals. As described above, the broadcast interval may correspond to the interval between times at which a device needs to wake up to receive broadcast and/or multicast packets. In 802.11 embodiments, this may be at the DTIM time. If the desired sleep interval is greater than the broadcast interval (as is the case in FIG. 4), the next wake-up time may be set to the next broadcast time.

FIG. 5 shows a sequence in which the desired sleep interval is less than the broadcast interval. As shown in sequence 500, the desired sleep interval is two beacon intervals, and the broadcast interval is five beacon intervals. In some embodiments, the next wake-up time is set to the end of the desired sleep interval if at least two sleep intervals exist before the next broadcast time. In other words, the next wake-up time is set to the end of the desired sleep interval if the broadcast time is more than two desired sleep intervals since the last wake-up time. For example, at 502, the next broadcast time is five beacon intervals in the future, which is more than twice the desired sleep interval of two, so the next wake-up time is set to the end of a desired sleep interval, which is at 504. At 504, the next broadcast time is three beacon intervals away, which is less than twice the desired sleep interval, so the next wake-up time is set to be equal to the broadcast time at 506. For the example of FIG. 5, this pattern continues, and wake-up times are alternately scheduled for two and three beacon intervals until either the desired sleep interval or the broadcast interval is changed.

The calculations to determine the next wake-up time as demonstrated in FIG. 5 may also be expressed with the following pseudo-code:

If ((the difference between the next desired wake-up time and next broadcast time)>desired sleep interval) Then
    Set the next wake-up time to the next desired wakeup time
Else
    Set the next wake-up time to the next broadcast time.

For example, at 502, the next desired wake-up time is at 504 (2 beacon intervals away) and the next broadcast time is at 506 (5 beacon intervals away). The difference between 504 and 506 is three beacon intervals, which is greater than the desired sleep interval (two beacon intervals). Therefore, the next wake-up time is set to 504 (this is the "if" case in the pseudo-code example above). At 504, the next desired wake-up time is at 508 and the next broadcast time is at 506. The difference between 508 and 506 is one beacon interval, which is less than the desired sleep interval. Therefore the next wake-up time is set to 506 (this is the "else" case in the pseudo-code example above).

FIGS. 4 and 5 represent methods to determine a next wake-up time based on a desired sleep interval and a broadcast interval, where the desired sleep interval is based on an amount of traffic in a current interval. In some embodiments, the next wake-up time is determined in a manner different than that represented in FIGS. 4 and 5. For example, in some embodiments, a mobile station may need to be awake for more than one broadcast time, or for various other events. This information may be combined in any manner with a desired sleep interval that is derived from a traffic volume without departing from the scope of the present invention.

Figure 6:
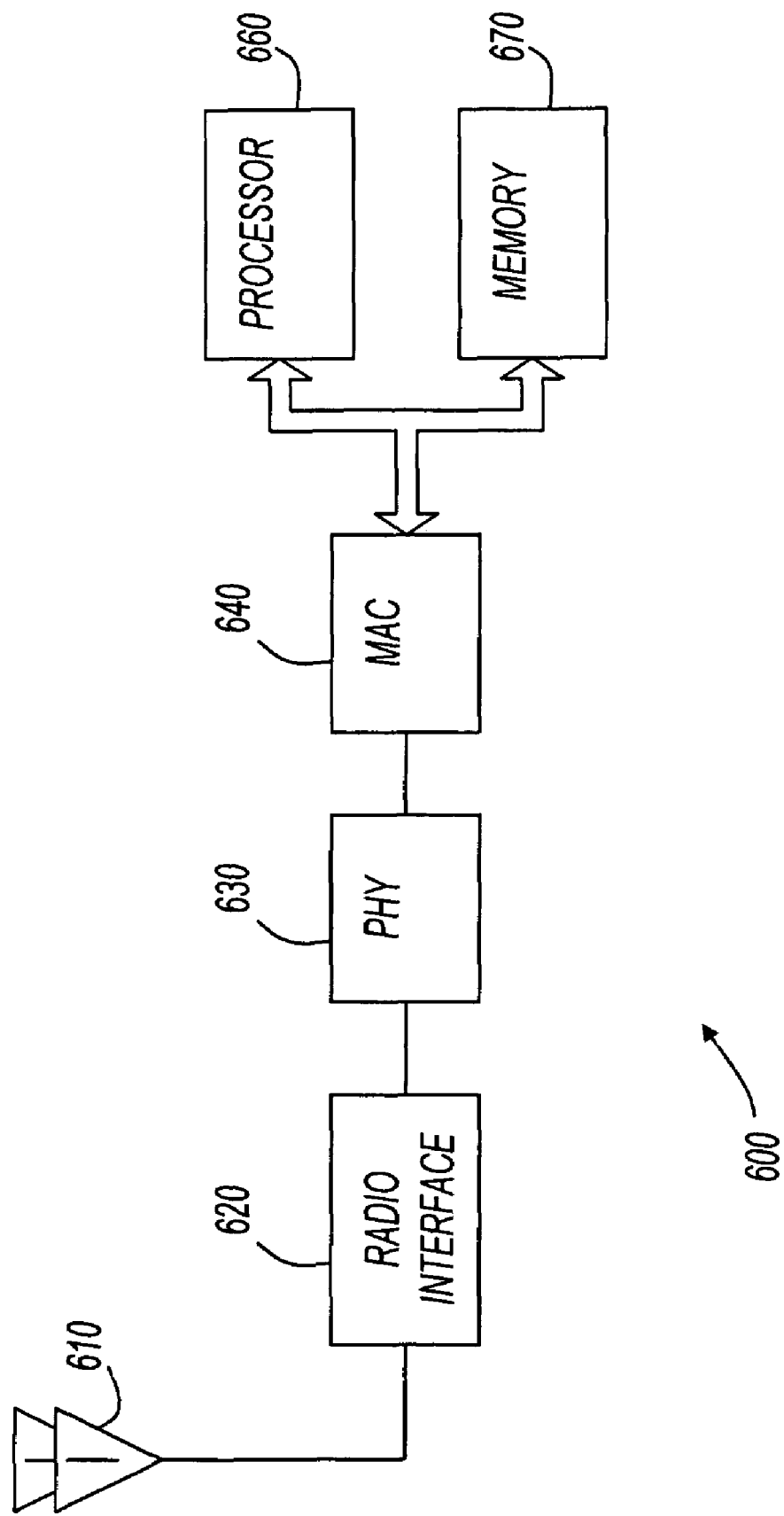
FIG. 6 shows a system diagram in accordance with various embodiments of the present invention.

FIG. 6 shows a system diagram in accordance with various embodiments of the present invention. Electronic system 600 includes antennas 610, radio interface 620, physical layer (PHY) 630, media access control (MAC) mechanism 640, processor 660, and memory 670. In some embodiments, electronic system 600 may be a mobile station, a wireless interface, a NIC, or the like. For example, electronic system 600 may be utilized in network 100 as any of mobile stations 110, 120, or 130, or NIC 114. Also for example, electronic system 600 may be an apparatus capable of performing any of the method embodiments described with reference to the previous figures.

In some embodiments, electronic system 600 may represent a system that includes a wireless interface as well as other circuits. For example, in some embodiments, electronic system 600 may be a computer, such as a personal computer, a workstation, or the like, that includes a wireless interface as a peripheral or as an integrated unit.

In operation, system 600 sends and receives signals using antennas 610, and the signals are processed by the various elements shown in FIG. 6. Antennas 610 may include one or more directional antennas or one or more omni-directional antennas. As used herein, the term omni-directional antenna refers to any antenna having a substantially uniform pattern in at least one plane. For example, in some embodiments, antennas 610 may include an omni-directional antenna such as a dipole antenna, or a quarter wave antenna. Also for example, in some embodiments, antennas 610 may include a directional antenna such as a parabolic dish antenna or a Yagi antenna. In some embodiments, antennas 610 form an array capable of supporting spatial division multiple access (SDMA) or multiple-input multiple output (MIMO) communications. In other embodiments, antennas 610 include only one physical antenna.

Radio interface 620 is coupled to antennas 610 to interact with a wireless network. Radio interface 620 may include circuitry to support the transmission and reception of radio frequency (RF) signals. For example, in some embodiments, radio interface 620 includes an RF receiver to receive signals and perform "front end" processing such as low noise amplification (LNA), filtering, frequency conversion or the like. Further, in some embodiments, radio interface 620 includes beamforming circuitry to support SDMA processing. Also for example, in some embodiments, radio interface 620 includes circuits to support frequency upconversion, and an RF transmitter. The invention is not limited by the contents or function of radio interface 620.

All or a portion of radio interface 620 may include the capability to be put into a reduced power state. For example, a transmitter within radio interface 620 may include circuitry to allow the transmitter to be powered-down or partially powered down. In some embodiments the transmitter may be powered down during periods that electronic system 600 is asleep. Further, in some embodiments, all of radio interface 620 may be powered down when electronic system 600 is asleep.

Physical layer (PHY) 630 may be any suitable physical layer implementation. For example, PHY 630 may be a circuit block that implements a physical layer that complies with an IEEE 802.11 standard or other standard. Examples include, but are not limited to, direct sequence spread spectrum (DSSS), frequency hopping spread spectrum (FHSS), and orthogonal frequency division multiplexing (OFDM). Like radio interface 620, all or a portion of PHY 630 may be put into a reduced power state to support various power savings modes.

Media access control (MAC) mechanism 640 may be any suitable media access control layer implementation. For example, MAC 640 may be implemented in software, or hardware or any combination thereof. In some embodiments, a portion of MAC 640 may be implemented in hardware, and a portion may be implemented in software that is executed by processor 660. Further, MAC 640 may include a processor separate from processor 660.

Processor 660 may perform method embodiments of the present invention, such as method 200 (FIG. 2) or method 300 (FIG. 3). Processor 660 represents any type of processor, including but not limited to, a microprocessor, a digital signal processor, a microcontroller, or the like.

Memory 670 represents an article that includes a machine readable medium. For example, memory 670 represents a random access memory (RAM), dynamic random access memory (DRAM), static random access memory (SRAM), read only memory (ROM), flash memory, or any other type of article that includes a medium readable by processor 660. Memory 670 may store instructions for performing the execution of the various method embodiments of the present invention.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method performed by a mobile station in a wireless network, the method comprising:
   determining a power savings level for the mobile station based on an amount of data traffic as a percentage of traffic activity in a current time interval;
   determining, from the power savings level, a desired sleep interval expressed as a plurality of 802.11 compliant beacon intervals;
   determining a next broadcast time from a broadcast interval expressed as a plurality of 802.11 compliant beacon intervals; and
   comparing the desired sleep interval and a time period until the next broadcast time to determine a wake-up time, wherein the wake-up time is set to the end of the desired sleep interval if at least two desired sleep intervals exist before the next broadcast time.

2. The method of claim 1 wherein the next broadcast time corresponds to a time to receive broadcast and multicast packets.

3. The method of claim 1 wherein the method is performed within a beacon monitor task run in response to an interrupt caused by a Target Beacon Transmission Times (TBTT) timer.

4. The method of claim 1 wherein determining a next broadcast time comprises examining a Delivery Traffic Indication Message (DTIM) count within a received beacon.

5. A method comprising:
   determining a desired sleep interval as a plurality of 802.11 compliant beacon intervals to sleep to save power, based on a volume of data traffic as a percentage of a current time interval;
   determining a broadcast time to wake up to receive packets from an access point;
   setting a wake-up time based on the desired sleep interval and the broadcast time, wherein setting a wake-up time comprises setting the wake-up time to the end of one desired sleep interval when at least two desired sleep intervals exist before the broadcast time;
   sleeping until the wake-up time;
   waking to receive an 802.11 compliant beacon; and
   if no 802.11 compliant beacon is received, sleeping for one additional 802.11 compliant beacon interval.

6. The method of claim 5 wherein determining broadcast time comprises examining a Traffic Indication Map (TIM) element within an 802.11 compliant beacon.

7. The method of claim 5 wherein setting a wake-up time comprises setting the wake-up time to the broadcast time when the broadcast time is less than two desired sleep intervals in the future.

8. A machine-readable medium with instructions stored thereon that when accessed, result in a machine performing the steps of:
   evaluating traffic activity at a mobile station in a wireless network;
   setting a power savings level for the mobile station based on the traffic activity;
   determining a desired sleep interval from the power savings level, wherein the desired sleep interval is expressed as a plurality of beacon intervals;
   determining a next broadcast time for the mobile station to be awake to receive broadcast packets;
   setting a sleep time associated with the desired sleep interval and the next broadcast time, wherein setting a sleep time comprises setting the sleep time to one desired sleep interval when at least two desired sleep intervals exist before the next broadcast time;
   putting the mobile station to sleep for the sleep time;
   waking up the mobile station to receive a beacon signal; and
   if the beacon signal is not received, putting the mobile station to sleep for one beacon interval.

9. The machine of claim 8 wherein evaluating traffic activity comprises determining a percentage of traffic timer over a time interval.

10. The machine of claim 9 wherein the power savings level may be set differently each time the traffic activity is evaluated.

11. The machine of claim 8 wherein setting a sleep time comprises determining a number of beacon intervals for the mobile station to sleep by comparing the desired sleep interval with a Delivery Traffic Indication Message (DTIM) count.

12. An apparatus configured to communicate in an 802.11 wireless network, to determine a power savings level for the apparatus based on an amount of data traffic as a percentage of traffic activity in a current time interval, to determine from the power savings level a desired sleep interval expressed as a plurality of 802.11 compliant beacon intervals, to determine a next broadcast time from a broadcast interval expressed as a plurality of 802.11 compliant beacon intervals, and to compare the desired sleep interval and a time period until the next broadcast time to determine a wake-up time, wherein the wake-up time is set to the end of the desired sleep interval if at least two desired sleep intervals exist before the next broadcast time.

13. The apparatus of claim 12 comprising a network interface card.

14. The apparatus of claim 12 comprising a mobile computer.

15. An electronic system comprising:
   a plurality of antennas;
   a radio interface coupled to the plurality of antennas;
   a processor coupled to the radio interface; and
   a static random access memory with instructions stored thereon that when accessed, result in the processor performing the steps of:
   evaluating traffic activity at the radio interface, setting a power savings level for the radio interface based on the traffic activity, determining a desired sleep interval based on the power savings level, wherein the desired sleep interval is expressed as a plurality of beacon intervals; determining a next broadcast time; setting a sleep time associated with the desired sleep interval and the next broadcast time, wherein setting a sleep time comprises setting the sleep time to one desired sleep interval when at least two desired sleep intervals exist before the next broadcast time, putting the radio interface to sleep for the sleep time, waking the radio interface to receive a beacon signal, and putting the radio interface back to sleep for one beacon interval if a beacon signal is not received.

* * * * *